(12) United States Patent
Sumiya (10) Patent No.: US 11,735,224 B1
(45) Date of Patent: Aug. 22, 2023

(54) MOLD, TAPE REEL, AND TAPE CARTRIDGE

(71) Applicant: FUJIFILM CORPORATION, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/160,309

(22) Filed: Jan. 27, 2023

(30) Foreign Application Priority Data

Mar. 8, 2022 (JP) .................................. 2022-035614

(51) Int. Cl.
  *G11B 23/113* (2006.01)
  *B29C 45/26* (2006.01)
  *G11B 23/07* (2006.01)
  *G11B 23/107* (2006.01)

(52) U.S. Cl.
  CPC ........ *G11B 23/113* (2013.01); *B29C 45/2616* (2013.01); *G11B 23/07* (2013.01); *G11B 23/107* (2013.01)

(58) Field of Classification Search
  None
  See application file for complete search history.

(56) References Cited

U.S. PATENT DOCUMENTS

| | | | |
|---|---|---|---|
| 2007/0278337 A1* | 12/2007 | Onmori | G11B 23/107 242/324 |
| 2009/0057462 A1 | 3/2009 | Tsuyuki et al. | |
| 2010/0123036 A1* | 5/2010 | Ishikawa et al. | G11B 23/107 242/348 |
| 2011/0095452 A1 | 4/2011 | Tsuyuki et al. | |
| 2015/0353320 A1 | 12/2015 | Mori | |
| 2016/0279848 A1* | 9/2016 | Sumiya | B29C 45/0025 |
| 2016/0284378 A1* | 9/2016 | Sumiya | G11B 23/107 |

FOREIGN PATENT DOCUMENTS

| | | |
|---|---|---|
| JP | 2009-064480 A | 3/2009 |
| JP | 2016-015191 A | 1/2016 |

* cited by examiner

*Primary Examiner* — Craig A. Renner
(74) *Attorney, Agent, or Firm* — Solaris Intellectual Property Group, PLLC

(57) ABSTRACT

There is provided a mold for molding a tape reel that is made of a resin and that includes a cylindrical portion, a bottom portion formed on a proximal end side of the cylindrical portion, and a plurality of through holes penetrating the bottom portion and arranged in a peripheral direction of the cylindrical portion, the mold including: a bottom surface that is used to form the bottom portion; a tubular surface that is used to form the cylindrical portion; and a plurality of projecting portions that protrude from the bottom surface and are used to form the plurality of through holes, respectively, in which, in the tubular surface, a first portion corresponding to a portion between the projecting portions adjacent to each other in the peripheral direction, among the plurality of projecting portions, has a shape that bulges toward a radially outer side of the bottom surface than a second portion corresponding to the projecting portion.

7 Claims, 8 Drawing Sheets

MOLD, TAPE REEL, AND TAPE CARTRIDGE

CROSS-REFERENCE TO RELATED APPLICATIONS

This application claims priority under 35 USC 119 from Japanese Patent Application No. 2022-035614 filed on Mar. 8, 2022, the disclosure of which is incorporated by reference herein.

BACKGROUND

1. Technical Field

The technology of the present disclosure relates to a mold, a tape reel, and a tape cartridge.

2. Related Art

JP2016-15191A discloses a reel including a bottomed cylindrical hub which is molded from a resin material and of which an upper end part side is open, a lower flange provided on a lower end part side of the hub and molded integrally with the hub, an annular upper flange facing the lower flange, and a welded portion in which a lower surface of the upper flange and an upper end surface of the hub are bonded to each other.

JP2009-64480A discloses a producing method of producing a reel of a recording tape cartridge using a mold.

SUMMARY

An embodiment according to the technology of the present disclosure provides a mold capable of forming a cylindrical portion of a tape reel into a shape close to a perfect circle, a tape reel of which a cylindrical portion has a shape close to a perfect circle, and a tape cartridge provided with a tape reel of which a cylindrical portion has a shape close to a perfect circle.

According to a first aspect of the technology of the present disclosure, there is provided a mold for molding a tape reel that is made of a resin and that includes a cylindrical portion, a bottom portion formed on a proximal end side of the cylindrical portion, and a plurality of through holes penetrating the bottom portion and arranged in a peripheral direction of the cylindrical portion, the mold comprising: a bottom surface that is used to form the bottom portion; a tubular surface that is used to form the cylindrical portion; and a plurality of projecting portions that protrude from the bottom surface and are used to form the plurality of through holes, in which, in the tubular surface, a first portion corresponding to a portion between the projecting portions adjacent to each other in the peripheral direction, among the plurality of projecting portions, has a shape that bulges toward a radially outer side of the bottom surface than a second portion corresponding to the projecting portion.

According to a second aspect of the technology of the present disclosure, in the mold according to the first aspect, the first portion is a portion corresponding to a central part between the adjacent projecting portions.

According to a third aspect of the technology of the present disclosure, in the mold according to the first or second aspect, the tubular surface has a shape that expands toward the radially outer side as a distance from the bottom surface increases.

According to a fourth aspect of the technology of the present disclosure, in the mold according to any one of the first to third aspects, the plurality of projecting portions are disposed at an equal interval in the peripheral direction.

According to a fifth aspect of the technology of the present disclosure, in the mold according to any one of the first to fourth aspects, the number of the plurality of projecting portions is three.

According to a sixth aspect of the technology of the present disclosure, there is provided a tape reel that is made of a resin and that is molded using the mold according to any one of the first to fifth aspects, the tape reel comprising: a cylindrical portion; a bottom portion provided on one end side in an axial direction of the cylindrical portion; and a plurality of through holes penetrating the bottom portion and formed in a peripheral direction of the cylindrical portion, in which roundness of a proximal end of the cylindrical portion is 20 μm or less.

According to a seventh aspect of the technology of the present disclosure, there is provided a tape cartridge comprising: the tape reel according to the sixth aspect; and a case that rotatably supports the tape reel and accommodates the tape reel and a tape wound around the tape reel.

BRIEF DESCRIPTION OF THE DRAWINGS

Exemplary embodiments of the technology of the disclosure will be described in detail based on the following figures, wherein.

DETAILED DESCRIPTION

An example of embodiments according to the technology of the present disclosure will be described with reference to the accompanying drawings.

Figure 1:
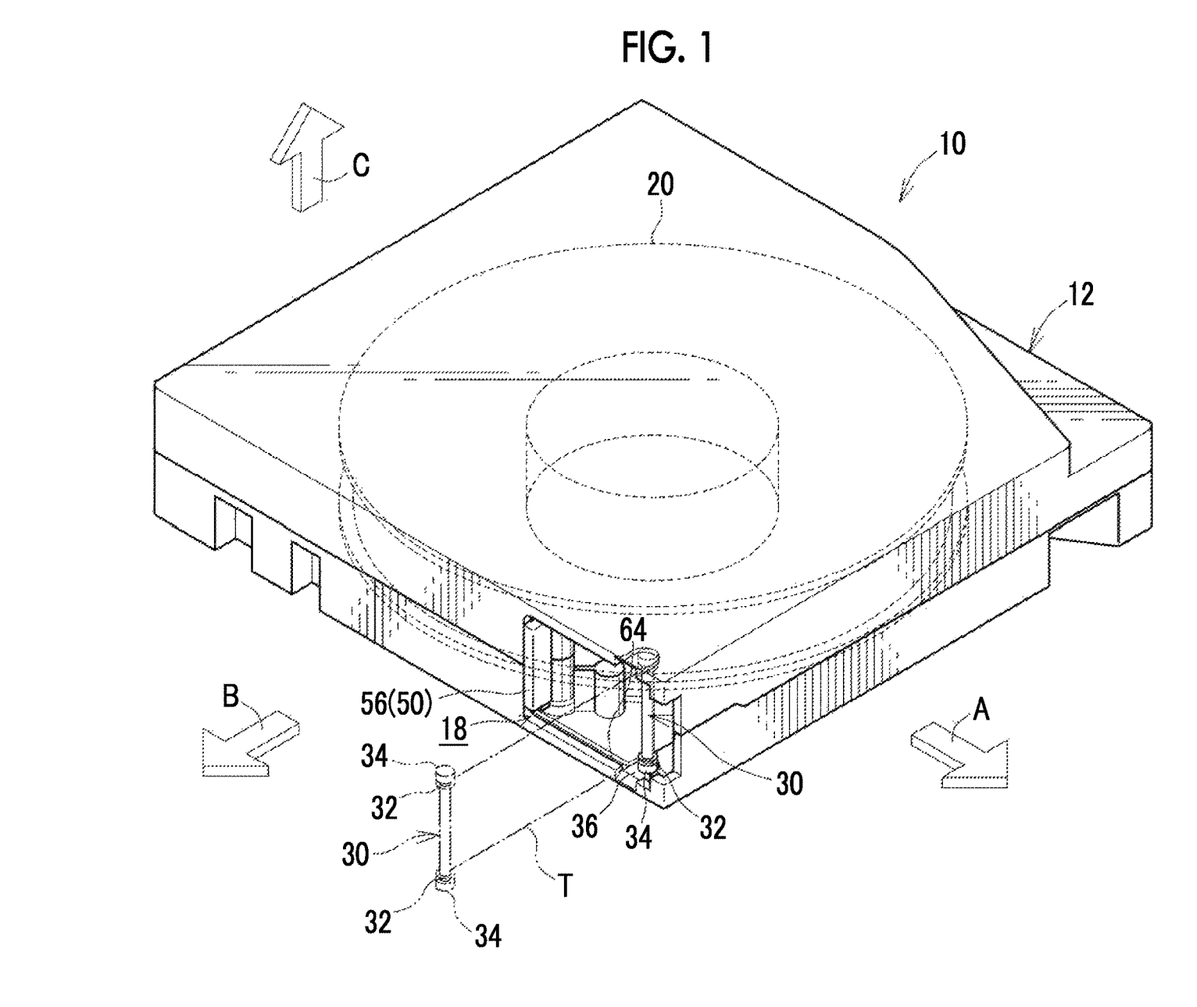
FIG. 1 is a perspective view showing a tape cartridge provided with a tape reel according to a first embodiment.

As shown in FIG. 1, a tape cartridge 10 has a case 12. One tape reel 20 is accommodated in the case 12. A recording tape T is wound around the tape reel 20. Details of the case 12 and the tape reel 20 will be described later. The case 12 is an example of a "case" according to the technology of the present disclosure. The tape reel 20 is an example of a "tape reel" according to the technology of the present disclosure. The tape cartridge 10 is an example of a "tape cartridge" according to the technology of the present disclosure.

The tape cartridge 10 is inserted into a drive device (not shown). In the drive device, the recording tape T is unwound from the tape cartridge 10, and information is written onto and read out from the recording tape T.

In the drawings, an arrow A indicates a loading direction of the tape cartridge 10 into the drive device. A direction indicated by the arrow A is a front direction of the tape cartridge 10. A direction indicated by an arrow B perpendicular to the arrow A is set as a right direction of the tape cartridge 10, and a direction indicated by an arrow C perpendicular to the arrow A and the arrow B is set as an upper direction of the tape cartridge 10 and the tape reel 20. In addition, in the following, a radial direction and a peripheral direction of the tape reel 20 may be simply referred to as a "radial direction" and a "peripheral direction". The above-described front direction, right direction, and upper direction are directions defined for convenience and do not limit a direction of the tape cartridge according to the technology of the present disclosure.

Figure 2:
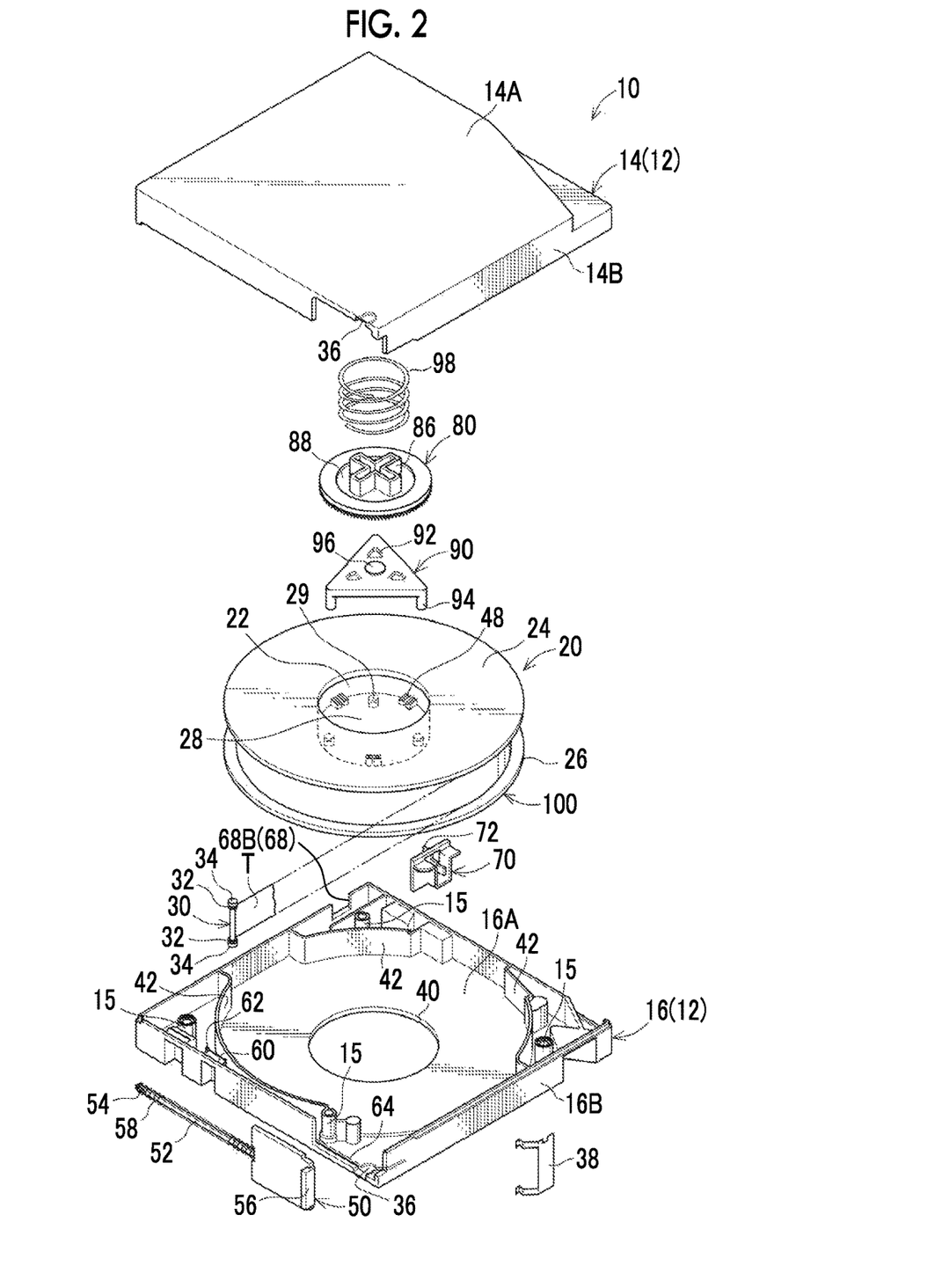
FIG. 2 is an exploded perspective view showing the tape cartridge provided with the tape reel according to the first embodiment as viewed from above.
Figure 3:
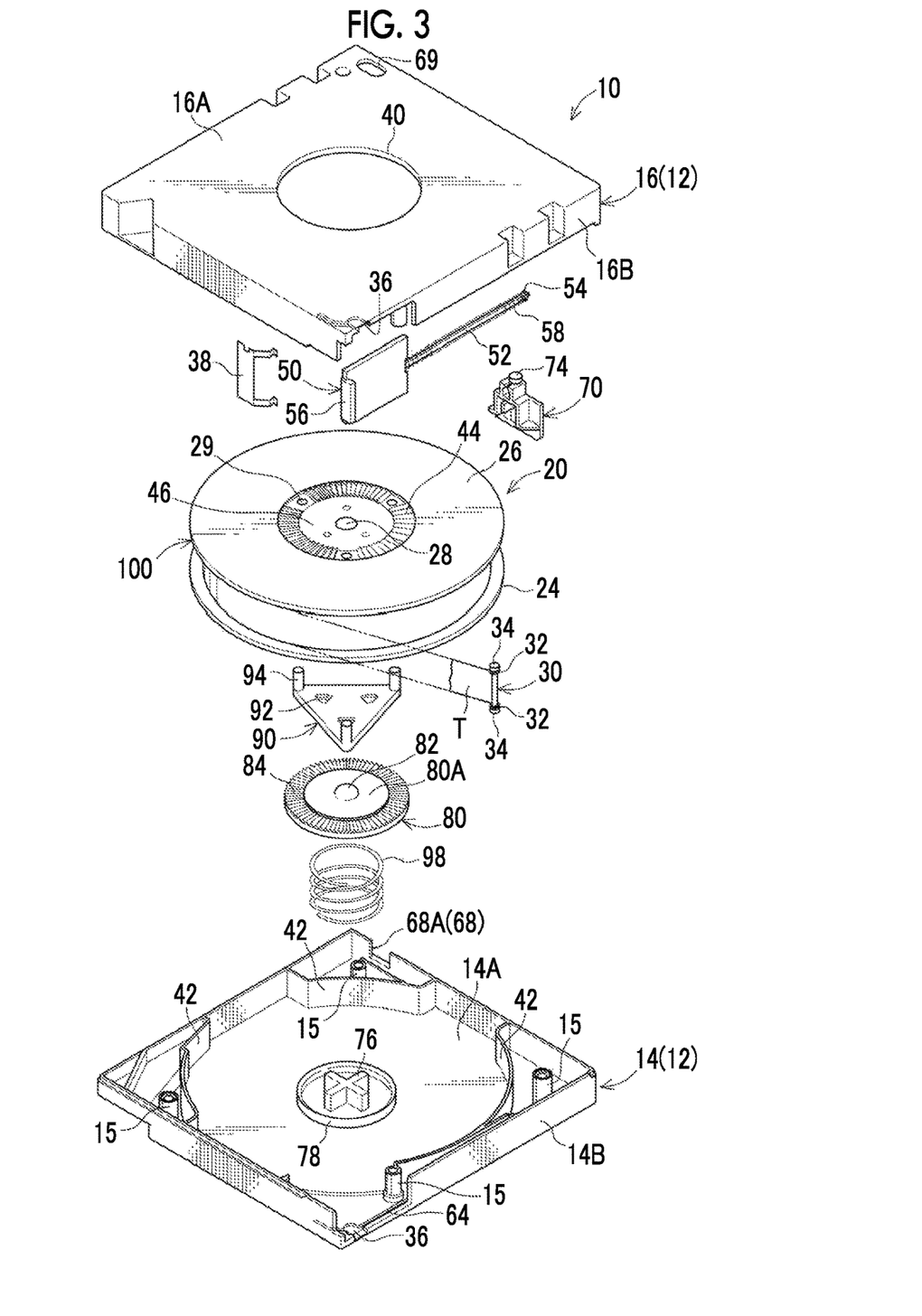
FIG. 3 is an exploded perspective view showing the tape cartridge provided with the tape reel according to the first embodiment as viewed from below.

As shown in FIGS. 1 to 3, the case 12 is formed in a rectangular flat box shape. The case 12 has an upper case 14 and a lower case 16. A peripheral wall 14B is installed upright on a peripheral edge of a top plate 14A of the upper case 14, and a peripheral wall 16B is installed upright on a peripheral edge of a bottom plate 16A of the lower case 16. The upper case 14 and the lower case 16 are joined to each other by, for example, ultrasonic welding and/or screwing in a state in which a lower end of the peripheral wall 14B and an upper end of the peripheral wall 16B are in contact with each other. The upper case 14 and the lower case 16 are made of a resin, such as polycarbonate (PC), as an example.

In the examples shown in FIGS. 2 and 3, screw bosses 15 are formed in the vicinity of a plurality of corner portions of each of the upper case 14 and the lower case 16, respectively. The upper case 14 and the lower case 16 are joined to each other by screwing a screw (not shown) into each screw boss 15 from a lower surface side of the lower case 16, whereby the case 12 is assembled. One tape reel 20 made of a resin is rotatably accommodated inside the case 12.

The tape reel 20 has a hub 22, an upper flange 24, and a lower flange 26. The hub 22 is an example of a "cylindrical portion" according to the technology of the present disclosure. The hub 22 is molded into a bottomed cylindrical shape of which an upper end part side is open. The upper flange 24 is formed in an annular shape, and the lower flange 26 is also formed in an annular shape. The upper flange 24 and the lower flange 26 face each other.

In the present embodiment, the upper flange 24 is ultrasonically welded to the upper end part side of the hub 22. On the other hand, the lower flange 26 is molded on a lower end part side of the hub 22 integrally with the hub 22. That is, a hub member with a lower flange 100 is composed of the hub 22 and the lower flange 26.

The recording tape T is wound around an outer peripheral surface of the hub 22. The recording tape T is an example of a magnetic tape or the like as an information recording/reproducing medium. Positions of both end parts in a width direction of the wound recording tape T are restricted by the upper flange 24 and the lower flange 26 that face each other in parallel.

The hub 22 has a bottom wall 28 formed on one end side in an axial direction of the hub 22, specifically, on a proximal end side. The bottom wall 28 is an example of a "bottom portion" according to the technology of the present disclosure. The bottom wall 28 is perpendicular to the hub 22. A reel gear 44 is formed in an annular shape on a lower surface (outer surface) of the bottom wall 28.

A gear opening portion 40 for exposing the reel gear 44 to the outside of the case 12 is formed in a central part of the lower case 16. The reel gear 44 exposed from the gear opening portion 40 meshes with a drive gear (not shown) formed on a rotary shaft (not shown) of the drive device. Then, the reel gear 44 is rotationally driven by the drive gear, whereby the tape reel 20 rotates relative to the case 12 in the case 12.

A reel plate 46 is stuck radially inward of the reel gear 44 in the lower surface of the bottom wall 28. The reel plate 46 is a disc-shaped metal plate formed of a magnetic material. The reel plate 46 is stuck coaxially and integrally with the hub 22 by, for example, insert molding. The reel plate 46 is adsorbed/held by a magnetic force of an annular magnet (not shown) provided in the rotary shaft of the drive device.

A plurality of floating restriction walls 42 are partially provided on an inner surface of each of the upper case 14 and the lower case 16. Each floating restriction wall 42 is formed in an arc shape concentric with the gear opening portion 40. The tape reel 20 is held so as not to rattle in the radial direction by being surrounded by the plurality of floating restriction walls 42.

An opening 18 is formed in a right wall of the case 12. The recording tape T wound around the tape reel 20 can be pulled out through the opening 18.

A leader pin 30 is stuck to a free end part of the recording tape T pulled out from the opening 18. The leader pin 30 is locked by a pull-out member (not shown) of the drive device and is operated to be pulled out. Both end parts of the leader pin 30 protrude with respect to the end parts in the width direction of the recording tape T. An annular groove 32 is formed in each of both end parts of the leader pin 30. The annular groove 32 is locked to a hook or the like of the pull-out member of the drive device.

A pair of pin holding portions 36 are provided inside the opening 18 of the case 12. In the example shown in FIG. 2, respective pin holding portions 36 are provided so as to face an inner surface of the top plate 14A of the upper case 14 and an inner surface of the bottom plate 16A of the lower case 16. The pin holding portions 36 position and hold the leader pin 30 in the case 12. The pin holding portion 36 has a substantially semi-circular shape in which a side from which the recording tape T is pulled out is open. Each of both end parts 34 of the leader pin 30 can enter and exit the pin holding portion 36 from an open side of the pin holding portion 36.

A leaf spring 38 is fixed in the case 12. The leaf spring 38 is disposed on an inner side of the case 12 with respect to the pin holding portion 36. The leaf spring 38 has bifurcated tip parts. The tip parts of the leaf spring 38 are engaged with both end parts 34 on the upper and lower sides of the leader pin 30, respectively, whereby the leader pin 30 is held by the pin holding portions 36. In a case where the leader pin 30 enters and exits the pin holding portions 36, each tip part of the leaf spring 38 is appropriately elastically deformed to allow the leader pin 30 to move.

A door 50 is provided in the case 12. The door 50 is formed in a rectangular plate shape having a size capable of closing the opening 18. Groove portions 64 are formed in the top plate 14A and the bottom plate 16A inside the opening 18. Upper and lower end parts of the door 50 are slidably fitted into the groove portions 64, respectively. With this, the door 50 moves along the right wall of the case 12 and opens and closes the opening 18.

A shaft 52 is provided at a rear end of the door 50 in a protruding manner. A coil spring 58 is inserted onto the shaft 52. A spreading portion 54 is formed at the rear end of the shaft 52. The coil spring 58 is prevented from falling off from the shaft 52 by the spreading portion 54. A support mount 60 having a locking portion 62 is provided in the lower case 16 in a protruding manner. A rear end of the coil spring 58 inserted onto the shaft 52 is locked to the locking portion 62.

The shaft 52 is slidably supported on the support mount 60, and the rear end of the coil spring 58 is locked to the locking portion 62. With this, the door 50 is always biased in a closing direction of the opening 18 by a biasing force of the coil spring 58.

A projecting portion 56 is provided at a front end of the door 50 so as to protrude outward. With the insertion and loading of the tape cartridge 10 into the drive device, the projecting portion 56 is engaged with an opening and closing member (not shown) provided on the drive device side. The opening and closing member provided on the drive device side applies a force to an opening side of the door 50 with respect to the projecting portion 56, whereby the door 50 is opened against the biasing force of the coil spring 58.

A write protect 70 is provided in a left rear portion of the case 12. The write protect 70 is slidable in a left-right direction.

The write protect 70 is a member that sets "possible" or "impossible" of recording on the recording tape T. An operation protrusion 72 for manually sliding the write protect 70 in the left-right direction is formed on the write protect 70.

An open hole 68 is formed in a rear wall of the case 12. The operation protrusion 72 protrudes from the open hole 68 to the outside of the case 12. In the examples shown in FIGS. 2 and 3, a notched portion 68A is formed in the peripheral wall 14B of the upper case 14, and a notched portion 68B is formed in the peripheral wall 16B of the lower case 16. The open hole 68 is formed by the notched portion 68A and the notched portion 68B in a state in which the upper case 14 and the lower case 16 are joined to each other.

A protruding portion 74 is formed on the write protect 70. An elongated hole 69 is formed in the lower case 16. A longitudinal direction of the elongated hole 69 matches the left-right direction of the case 12. The protruding portion 74 is exposed to the outside of the case 12 from the elongated hole 69. In a state in which the tape cartridge 10 is loaded in the drive device, the position of the protruding portion 74 is detected on the drive device side, and "possible" or "impossible" of recording on the recording tape T is determined.

A plurality of engaging gears 48 are provided on a peripheral edge of the upper surface of the bottom wall 28 of the hub 22. The plurality of engaging gears 48 are provided in the peripheral direction of the hub 22 with a gap therebetween (for example, at an equal interval). A plurality of through holes 29 are formed at positions on the reel gear 44 and between the plurality of engaging gears 48. In the example shown in FIGS. 2 and 5, the number of the plurality of engaging gears 48 is three. The three engaging gears 48 are arranged at intervals of 120 degrees in the peripheral direction of the hub 22. The number of the plurality of through holes 29 is also three. The three through holes 29 are also arranged at intervals of 120 degrees in the peripheral direction of the hub 22. The through hole 29 is an example of a "through hole" according to the technology of the present disclosure.

A braking member 80 is disposed inside the hub 22. The braking member 80 is a disc-shaped member molded from a resin material as an example. A cylindrical cavity of the hub 22 is a space capable of accommodating a braking mechanism including the braking member 80. Further, a hole portion 25A of the upper flange 24 is a hole through which the braking mechanism can pass and operate.

An annular braking gear 84 is formed on a peripheral edge of a lower surface 80A of the braking member 80. The braking gear 84 can mesh with the engaging gears 48.

A rotation restricting rib 76 is provided so as to protrude downward from the inner surface of the top plate 14A of the upper case 14. The rotation restricting rib 76 has a cross shape in a plan view. An engaging protrusion 86 having a cross shape in a plan view is provided on an upper surface of the braking member 80 in a protruding manner. A height of the engaging protrusion 86 is higher than a height of the rotation restricting rib 76. In a state in which the rotation restricting rib 76 is inserted into the engaging protrusion 86, the braking member 80 is non-rotatable with respect to the case 12 (specifically, the upper case 14) and is movable in an up-down direction in the hub 22.

A compression coil spring 98 is disposed between the upper case 14 and the braking member 80. The braking member 80 is biased downward by a biasing force of the compression coil spring 98. As shown in FIG. 3, an annular protrusion 78 is provided outside the rotation restricting rib 76 of the upper case 14 in a protruding manner. One end of the compression coil spring 98 is located inside the annular protrusion 78 (specifically, between the rotation restricting rib 76 and the annular protrusion 78). Further, as shown in FIG. 2, an annular groove 88 is provided in the upper surface of the braking member 80. The other end of the compression coil spring 98 is located in the annular groove 88.

The braking gear 84 meshes with the engaging gears 48 in a state in which the tape cartridge 10 is not used (that is, a state in which the tape cartridge 10 is not loaded in the drive device). The braking gear 84 meshes with the engaging gears 48, thereby preventing the tape reel 20 from rotating relative to the case 12. Then, the tape reel 20 is pushed toward the lower case 16 side by the biasing force of the compression coil spring 98, and the reel gear 44 is exposed from the gear opening portion 40.

A release member 90 is disposed inside the hub 22. The release member 90 is located below the braking member 80 (specifically, between the bottom wall 28 and the braking member 80). The release member 90 is a member molded from a resin material and having a regular triangular shape in a plan view. A plurality of through holes 92 are formed in the release member 90 so that a weight of the release member 90 can be reduced.

A plurality of leg portions 94 are provided on a lower surface of the release member 90 in a protruding manner. In the examples shown in FIGS. 2 and 3, the leg portion 94 is provided at each apex portion of the release member 90. The leg portion 94 is inserted into the through hole 29 and protrudes onto the reel gear 44 from the lower surface of the bottom wall 28.

As shown in FIG. 2, a support projecting portion 96 is formed at the center of an upper surface of the release member 90. As shown in FIG. 3, a hemispherical release protrusion 82 is provided at the center of the lower surface 80A of the braking member 80 in a protruding manner. The release protrusion 82 is in contact with the support projecting portion 96. With this, a contact area between the braking member 80 and the release member 90 is reduced, and a sliding resistance in a use state (that is, a state in which the tape reel 20 rotates) is reduced. For example, polyacetal (POM) can be used as a material of the braking member 80. For example, polybutylene terephthalate (PBT) can be used as a material of the release member 90.

Figure 4:
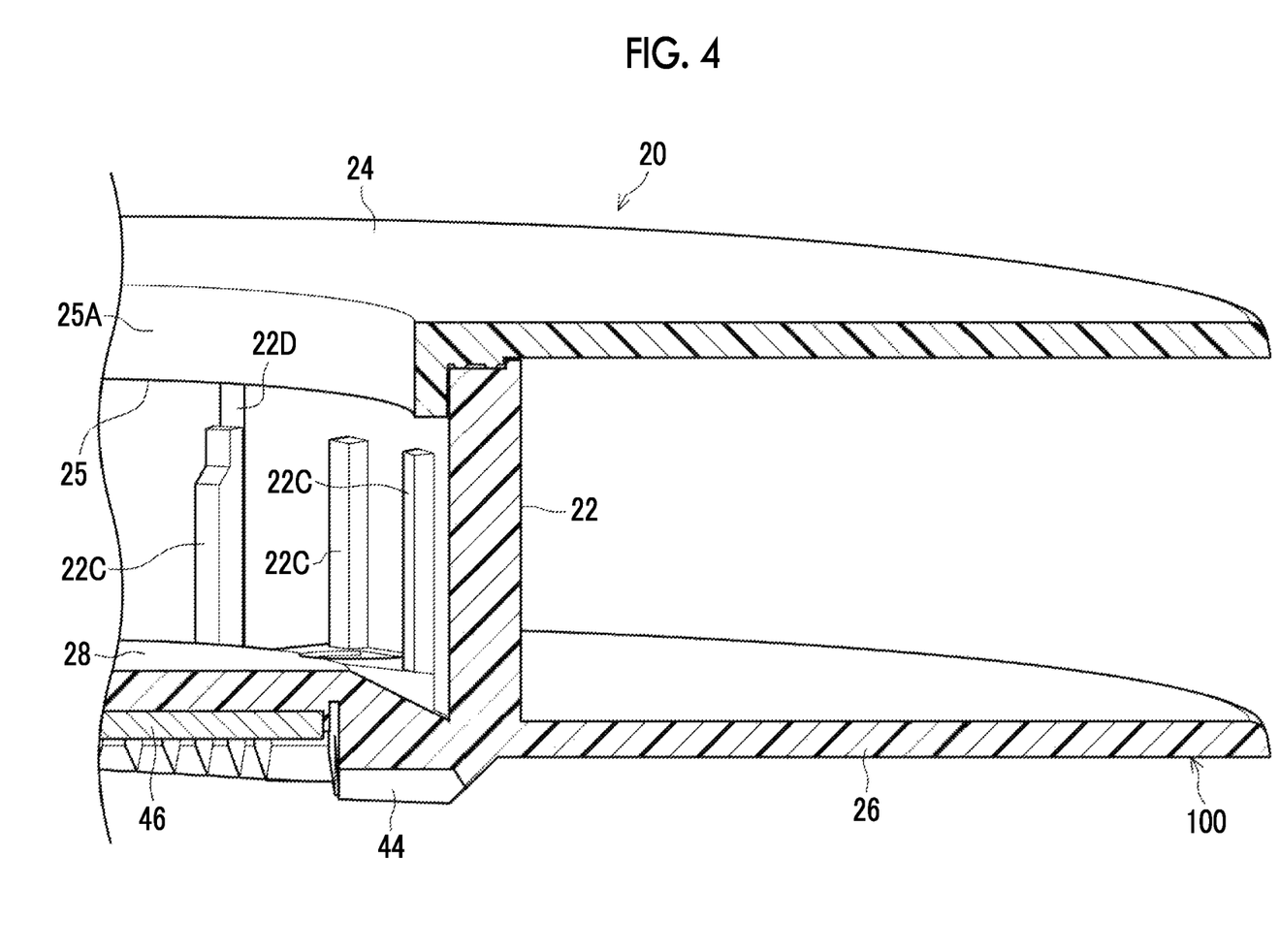
FIG. 4 is a perspective view showing a partially enlarged cross section of the tape reel according to the first embodiment.

As shown in FIG. 4, a short cylindrical portion 25 is installed upright on an inner peripheral portion side (specifically, on an inner peripheral edge portion) of the upper flange 24. The short cylindrical portion 25 is inserted inside the hub 22 along an inner peripheral surface of the hub 22.

Figure 5:
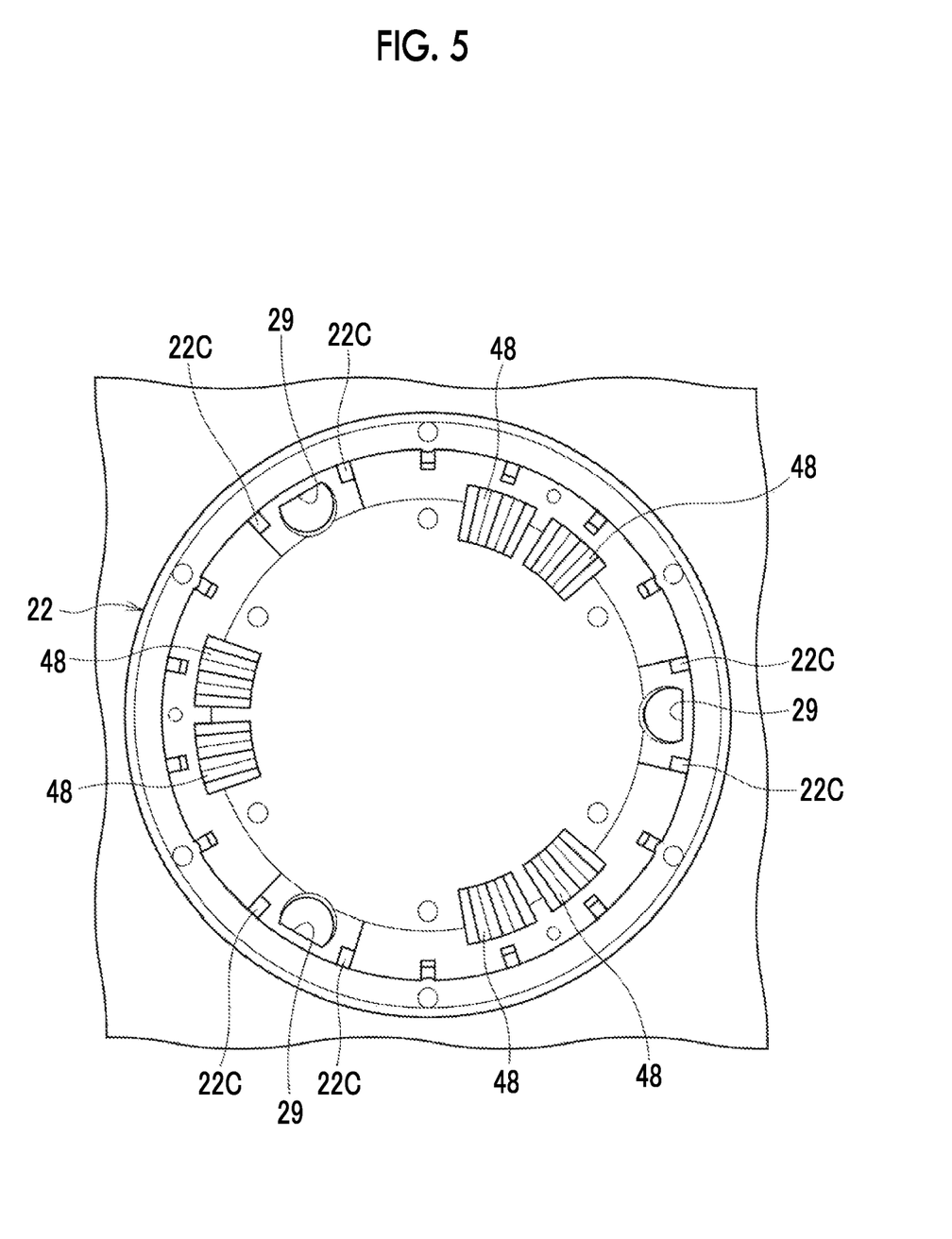
FIG. 5 is a partially enlarged plan view showing the tape reel according to the first embodiment.

As shown in FIG. 5, a plurality of restricting ribs 22C extending in the up-down direction are formed on the inner peripheral surface of the hub 22. The plurality of restricting ribs 22C are formed at equal intervals in the peripheral direction. In a case where the braking member 80 moves in the hub 22 in the up-down direction, a radial position of the braking member 80 is restricted from an outer side. Further, a plurality of projecting portions 22D are formed on the inner peripheral surface of the hub 22. Each of the projecting portions 22D extends in the up-down direction separately from each of the restricting ribs 22C. The number of the plurality of projecting portions 22D is, for example, six. The plurality of projecting portions 22D are formed at equal intervals in the peripheral direction.

Next, a method of molding the hub member with a lower flange 100 will be described.

Figure 6:
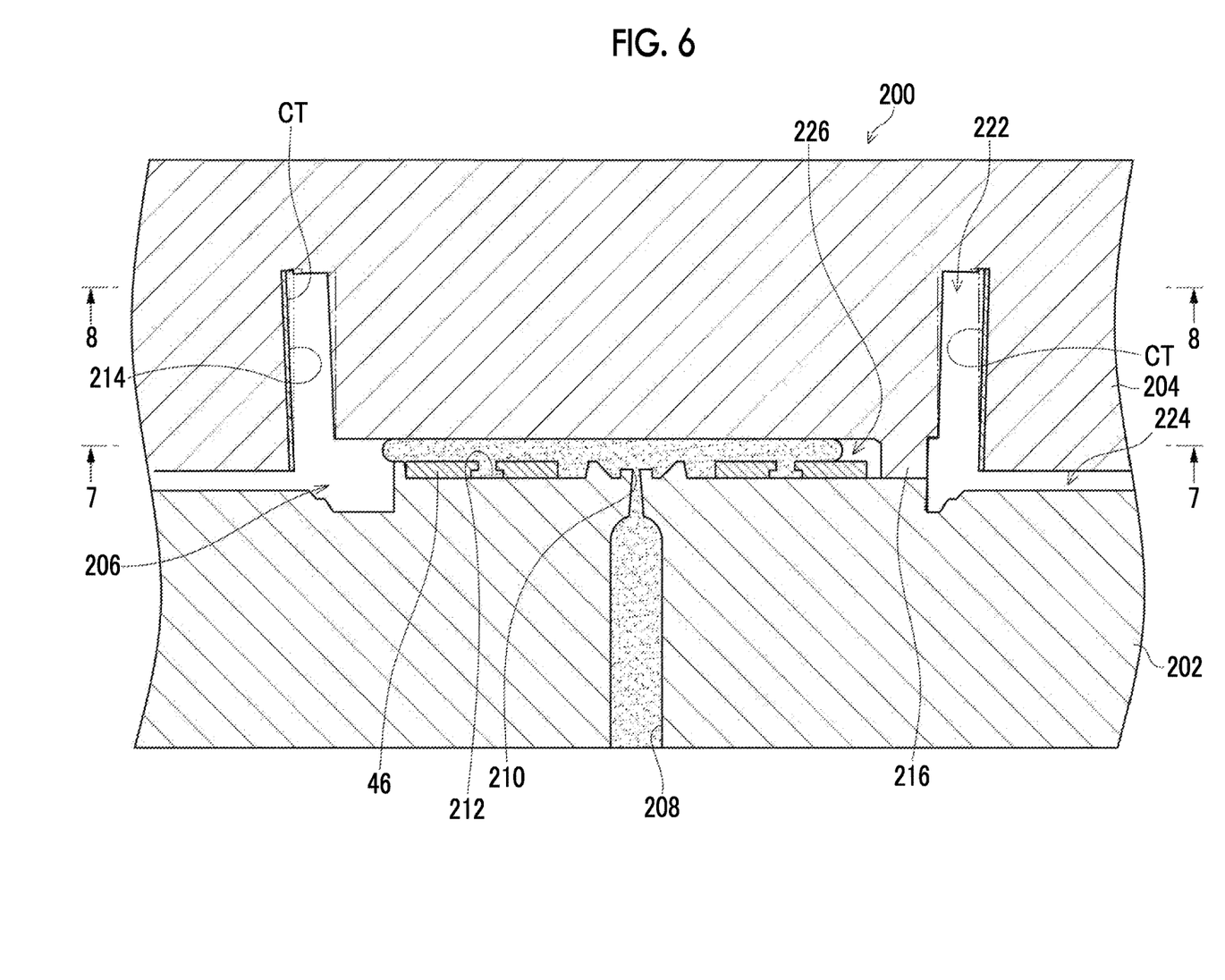
FIG. 6 is a vertical cross sectional view showing a mold used for producing the tape reel according to the first embodiment.
Figure 7:
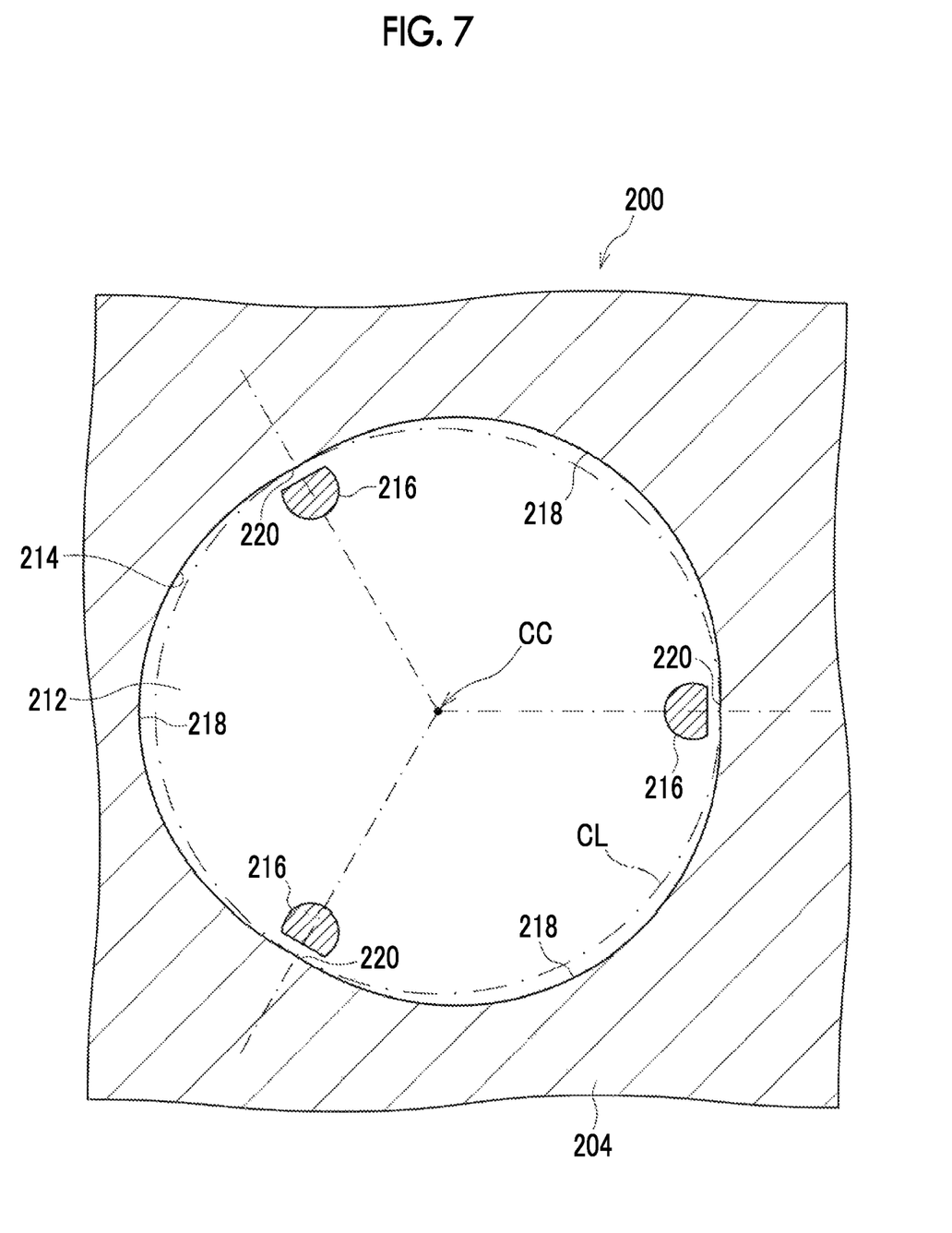
FIG. 7 is a cross sectional view showing the mold used for producing the tape reel according to the first embodiment with a cross section taken along line 7-7 of FIG. 6.
Figure 8:
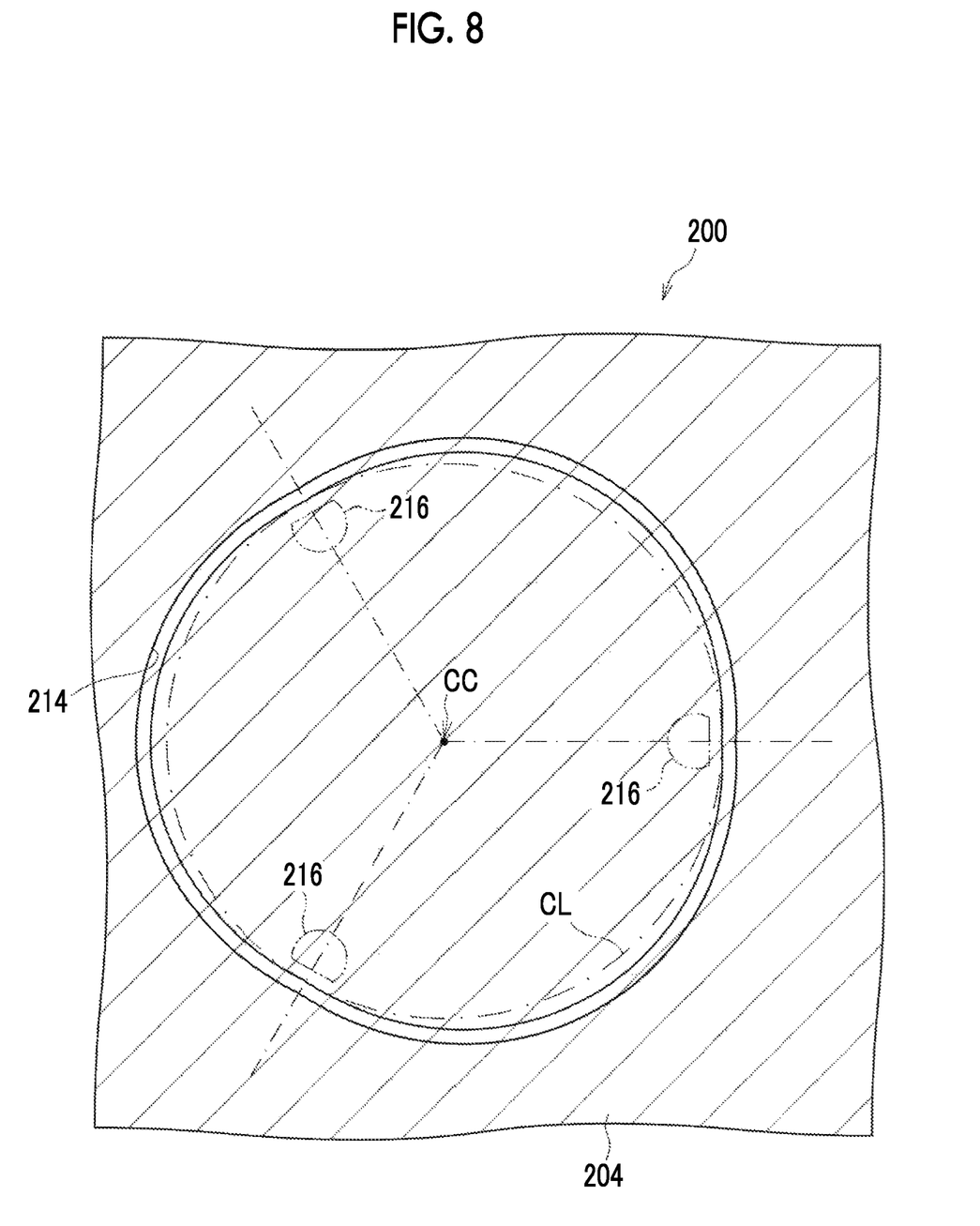
FIG. 8 is a cross sectional view showing the mold used for producing the tape reel according to the first embodiment with a cross section taken along line 8-8 of FIG. 6.

The hub member with a lower flange 100 is formed by injection molding using a mold 200 shown in FIGS. 6 to 8. The mold 200 is an example of a "mold" according to the technology of the present disclosure.

As shown in FIG. 6, the mold 200 has a fixed side mold plate 202 and a movable side mold plate 204. A cavity 206 is formed between the fixed side mold plate 202 and the movable side mold plate 204. The cavity 206 is filled with a resin material, whereby the hub member with a lower flange 100 is formed.

The mold 200 is produced using steel or the like, and has a hub forming portion 222 for forming the hub 22, a flange forming portion 224 for forming the lower flange 26, and a bottom wall forming portion 226 for forming the bottom wall 28. The mold 200 is produced using, for example, steel.

One or more gates 210 are formed in the fixed side mold plate 202. The gate 210 is an inlet of the resin to the cavity 206.

The reel plate 46 is set in the cavity 206. The resin material ejected from a molding machine (not shown) is injected into the cavity 206 through the gate 210 by way of a flow passage 208 formed in the fixed side mold plate 202. Then, the resin is cooled and solidified in the cavity 206. After the resin material is solidified, the mold 200 is opened, and the hub member with a lower flange 100 is released from the mold 200. As a result, the hub member with a lower flange 100 is formed.

The mold 200 has a bottom surface 212 and a tubular surface 214. The bottom surface 212 forms a part of the bottom wall forming portion 226, and the bottom surface 212 is a surface for forming the bottom wall 28 of the hub member with a lower flange 100. The bottom surface 212 is an example of a "bottom surface" according to the technology of the present disclosure. The tubular surface 214 is a surface for forming the hub 22 of the hub member with a lower flange 100. The tubular surface 214 is an example of a "tubular surface" according to the technology of the present disclosure.

Further, the mold 200 has a plurality of projecting portions 216 for forming the plurality of through holes 29, respectively. The number of the plurality of projecting portions 216 is the same as that of the plurality of through holes 29. In the present embodiment, since the plurality of through holes 29 are provided such that three through holes 29 are provided at equal intervals (specifically, at intervals of 120 degrees) in the peripheral direction of the hub 22, the plurality of projecting portions 216 are also provided such that three projecting portions 216 are provided at equal intervals (specifically, at intervals of 120 degrees) in the peripheral direction. The projecting portion 216 is an example of a "projecting portion" according to the technology of the present disclosure.

In the mold 200 shown in FIG. 6, a corrosion-resistant coating CT is applied to the tubular surface 214. The tubular surface 214 is restrained from corroding over time as compared with a case where the corrosion-resistant coating CT is not applied, even in a case where a corrosive gas is generated from the molten resin material during the molding with the mold 200. The mold of the disclosed technology in the present application may have a structure in which the corrosion-resistant coating CT is not applied to the tubular surface 214.

FIG. 7 shows the mold 200 in a cross section taken along line 7-7 of FIG. 6. FIG. 8 shows the mold 200 in a cross section taken along line 8-8 of FIG. 6. A position of the cross section taken along line 8-8 is a position farther from the bottom surface 212 than the position of the cross section taken along line 7-7.

As shown in FIG. 7, a portion of the tubular surface 214 located between the projecting portions 216 adjacent to each other in the peripheral direction is a first portion 218. In the present embodiment, in particular, a portion corresponding to a central part (that is, a portion located at the center) between the projecting portions 216 adjacent to each other in the peripheral direction is the first portion 218. The first portion 218 is an example of a "first portion" according to the technology of the present disclosure. On the other hand, a portion corresponding to the projecting portion 216 is a second portion 220. The second portion 220 is an example of a "second portion" according to the technology of the present disclosure.

The first portion 218 has a shape that bulges toward a radially outer side of the bottom surface 212 than the second portion 220. Specifically, as shown in FIG. 7, a circle CL having, as a radius, a distance from a center CC of the bottom surface 212 to the second portion 220 is assumed. In the second portion 220, the tubular surface 214 is on the circle CL. In the tubular surface 214, the distance from the center CC increases while heading from the second portion 220 toward the first portion 218. In the first portion 218, the distance from the center CC to the second portion 220 is the longest.

In addition, as shown in FIGS. 6 and 8, the tubular surface 214 has a shape that expands toward the radially outer side as a whole as a distance from the bottom surface 212 increases. Here, in FIG. 6, a case where the tubular surface 214 extends in a direction away from the bottom surface 212 with a constant radius without expanding toward the radially outer side is indicated by an alternate long and two short dashes line. It can be seen that, as compared with the shape indicated by the alternate long and two short dashes line, the tubular surface 214 expands toward the radially outer side as a whole as the distance from the bottom surface 212 increases. That is, the tubular surface 214 has a shape that expands toward the radially outer side in the entire periphery while heading toward an upper side in FIG. 6. A peripheral length of the tubular surface 214 appearing in FIG. 8 is longer than a peripheral length of the tubular surface 214 appearing in FIG. 7. In FIGS. 6 to 8, in order to clarify the above-described shape of the mold 200, a point that the first portion 218 bulges toward the radially outer side than the second portion 220 and a point that the tubular surface 214 expands toward the radially outer side as the distance from the bottom surface 212 increases are emphasized more than the actual shape of the mold.

The injection molding of the resin is performed using the above-described mold 200, whereby the hub member with a lower flange 100 having the lower flange 26 is formed (that is, produced).

Next, the action of the present embodiment will be described.

The hub member with a lower flange 100 of the present embodiment is formed by injection molding using the mold 200. In the injection molding, the resin is injected into the cavity 206 of the mold 200, and the injected resin contracts with solidification through cooling.

The mold 200 has the tubular surface 214 for forming the hub 22. The first portion 218 of the tubular surface 214 has a shape that bulges toward the radially outer side of the bottom surface 212 than the second portion 220. Therefore, the shape of the hub 22 before the contraction in the cavity 206 is a shape in which a portion in contact with the first portion 218 bulges toward the radially outer side than a portion in contact with the second portion 220.

In a case where the resin contracts with solidification through cooling in the cavity 206, the resin is restrained by the projecting portion 216 from contracting around the second portion 220. On the other hand, since the projecting portion 216 does not exist around the first portion 218, a force with which the resin is restrained from contracting by the projecting portion 216 is smaller than that around the second portion 220. That is, as the shape of the hub 22 to be molded, that is, the shape of the hub 22 after contraction, the degree of contraction of the resin around the first portion 218 is larger than that around the second portion 220.

As described above, the first portion 218 of the tubular surface 214 has a shape that bulges toward the radially outer side of the bottom surface 212 than the second portion 220. Therefore, in the hub 22 to be molded, the portion corresponding to the first portion 218 contracts more than the portion corresponding to the second portion 220. As a result, the cross sectional shape of the hub 22 after the contraction becomes a shape close to the perfect circle as compared with a case of using a mold in which the first portion 218 has a shape that does not bulge with respect to the second portion 220.

In particular, the first portion 218 of the tubular surface 214 is located at the center between the adjacent projecting portions 216. It is possible to form the hub 22 having a shape close to the perfect circle as compared with a mold provided with a tubular surface that does not have the first portion 218, that is, the portion which bulges toward the radially outer side, even at a position where the first portion 218 of the tubular surface 214 is displaced in the peripheral direction from the center between the adjacent projecting portions 216.

On the other hand, in the present embodiment, the first portion 218 is located at the central part between the adjacent projecting portions 216. Therefore, the hub 22 can be formed in a shape close to the perfect circle as compared with a case of using the mold provided with the tubular surface that does not have the portion that bulges toward the radially outer side at the central part between the adjacent projecting portions 216.

Further, the tubular surface 214 has a shape that expands toward the radially outer side as the distance from the bottom surface 212 increases. The peripheral length of the tubular surface 214 at the position of the cross section appearing in FIG. 8 is longer than the peripheral length of the tubular surface 214 at the position appearing in FIG. 7.

In a case where the resin injected into the cavity 206 of the mold 200 contracts, the resin does not easily contract because the projecting portion 216 of the mold 200 exists on the bottom surface 212 side, as compared with a case of using a mold in which the projecting portion 216 does not exist. However, as the distance from the bottom surface 212 increases, the degree of contraction increases as compared with the bottom surface 212 side. In the present embodiment, the tubular surface 214 has a shape that expands toward the radially outer side as the distance from the bottom surface 212 increases. Accordingly, the side away from the bottom surface 212 in the hub 22 contracts, so that deviation from the perfect circle can be restrained as compared with the bottom surface 212 side and the hub 22 having a shape close to the perfect circle can be obtained even on the side away from the bottom surface 212.

In the present embodiment, the plurality of projecting portions 216 are disposed at equal intervals in the peripheral direction of the tubular surface 214. Further, the plurality of first portions 218 of the tubular surface 214 of the mold 200 are also disposed at equal intervals in the peripheral direction. Therefore, it is possible to equalize the contraction in the peripheral direction during the molding of the hub 22. Further, the plurality of second portions 220 of the tubular surface of the mold 200 are also disposed at equal intervals in the peripheral direction. Therefore, it is possible to equalize the contraction in the peripheral direction during the molding of the hub 22, as compared with a case of using a mold having a configuration in which the plurality of second portions 220 are not formed at equal intervals in the peripheral direction.

In the present embodiment, three through holes 29 are formed in the bottom wall 28 of the hub 22. Since the mold 200 is formed with the three projecting portions 216 corresponding to the through holes 29, it is suitable for forming the hub 22 having the three through holes 29 in the bottom wall 28 as described above.

In the present embodiment, the tape reel 20 in which the roundness of the hub 22 is 20 μm or less can be obtained. This roundness is defined as (Dmax−Dmin)/2, where a maximum value of a diameter of the hub 22 is denoted by Dmax and a minimum value is denoted by Dmin. The roundness of the hub 22 according to the present embodiment satisfies the above-described condition of roundness at both the proximal end and the distal end.

In the tape reel 20 according to the present embodiment, the recording tape T is wound around the hub 22. Then, in the drive device, the recording tape T is unwound from the tape cartridge 10. In this case, the roundness of the hub 22 is 20 μm or less, so that the transport speed of the recording tape T is restrained from fluctuating and the transport speed can be brought close to the constant speed, as compared with a configuration in which the roundness is more than 20 μm. Further, the roundness of the hub 22 is 20 μm or less so that the transport speed of the recording tape T is restrained from fluctuating as compared with a configuration in which the roundness is more than 20 μm, whereby errors of reading-out and writing-in of information with respect to the recording tape T can also be restrained from occurring. In a case where the proximal end of the hub 22 satisfies the above-described condition of roundness, the effect of restraining the transport speed of the recording tape T from fluctuating and the effect of restraining errors of reading-out and writing-in of information with respect to the recording tape T from occurring can be obtained as compared with a configuration in which the roundness of the proximal end is more than 20 µm. Similarly, in a case where the distal end of the hub 22 satisfies the above-described condition of roundness, the effect of restraining the transport speed of the recording tape T from fluctuating and the effect of restraining errors of reading-out and writing-in of information with respect to the recording tape T from occurring can also be obtained as compared with a configuration in which the roundness of the distal end is more than 20 µm.

In order to actually decide the shape of the mold 200, the following method can be employed as an example.

That is, first, a hub member with a lower flange is formed using a mold in which the second portion 220 has a shape that does not bulge toward the radially outer side.

Then, the shape of the formed hub member with a lower flange is measured, and the shape of the mold is corrected from the measurement result. Further, the hub member with a lower flange is formed again using the corrected mold. This operation is performed a plurality of times to correct the shape of the mold, so that the shape of the hub of the hub member with a lower flange to be formed can be brought close to the perfect circle as compared with a case where the shape of the mold is not corrected. Therefore, in the hub 22 according to the technology of the present disclosure, a lower limit value of the roundness is not defined.

A material of the hub member with a lower flange 100 according to the technology of the present disclosure is not particularly limited as long as the material is a resin. From the viewpoint of satisfying the strength and durability required for the tape reel 20, for example, glass fiber reinforced polycarbonate is preferable. A content of glass fiber in the glass fiber reinforced polycarbonate is, for example, 10% or more and 30% or less.

In the description of the present specification, "parallel" indicates parallel in a meaning including an error generally allowed in the technical field to which the technology of the present disclosure belongs, in addition to completely parallel. In the description of the present specification, "perpendicular" indicates perpendicular in a meaning including an error generally allowed in the technical field to which the technology of the present disclosure belongs, in addition to completely perpendicular. In the description of the present specification, the "equal interval" indicates an equal interval in a meaning including an error generally allowed in the technical field to which the technology of the present disclosure belongs, in addition to the perfect equal interval. In the description of the present specification, "match" indicates a match in a meaning including an error generally allowed in the technical field to which the technology of the present disclosure belongs, in addition to the perfect match.

The contents described and shown above are detailed descriptions of the parts according to the technology of the present disclosure, and are merely an example of the technology of the present disclosure. For example, the above description related to configurations, functions, actions, and advantageous effects is description related to an example of the configurations, functions, actions, and advantageous effects of the parts according to the technology of the present disclosure. Therefore, it goes without saying that unnecessary parts may be deleted, new elements may be added, or the replacements may be made for the contents described and shown above without departing from the gist of the technology of the present disclosure. Further, in order to avoid complications and facilitate understanding of the parts according to the technology of the present disclosure, descriptions of common general knowledge and the like that do not require special descriptions for enabling the implementation of the technology of the present disclosure are omitted, in the contents described and shown above.

In the present specification, "A and/or B" has the same meaning as "at least one of A or B". That is, "A and/or B" means that only A may be used, only B may be used, or a combination of A and B may be used. In addition, in the present specification, the same concept as "A and/or B" is also applied to a case where three or more matters are expressed by "and/or".

All documents, patent applications, and technical standards described in the present specification are incorporated in the present specification by reference to the same extent as in a case where the individual documents, patent applications, and technical standards were specifically and individually stated to be incorporated by reference.

What is claimed is:

1. A mold for molding a tape reel that is made of a resin and that includes a cylindrical portion, a bottom portion formed on a proximal end side of the cylindrical portion, and a plurality of through holes penetrating the bottom portion and arranged in a peripheral direction of the cylindrical portion, the mold comprising:
    a bottom surface that is used to form the bottom portion;
    a tubular surface that is used to form the cylindrical portion; and
    a plurality of projecting portions that protrude from the bottom surface and are used to form the plurality of through holes, respectively,
    wherein, in the tubular surface, a first portion corresponding to a portion between the projecting portions adjacent to each other in the peripheral direction, among the plurality of projecting portions, has a shape that bulges toward a radially outer side of the bottom surface than a second portion corresponding to the projecting portion.

2. The mold according to claim 1,
    wherein the first portion is a portion corresponding to a central part between the adjacent projecting portions.

3. The mold according to claim 1,
    wherein the tubular surface has a shape that expands toward the radially outer side as a distance from the bottom surface increases.

4. The mold according to claim 1,
    wherein the plurality of projecting portions are disposed at an equal interval in the peripheral direction.

5. The mold according to claim 1,
    wherein the number of the plurality of projecting portions is three.

6. A tape reel that is made of a resin and that is molded using the mold according to claim 1, the tape reel comprising:
    a cylindrical portion;
    a bottom portion provided on one end side in an axial direction of the cylindrical portion; and
    a plurality of through holes penetrating the bottom portion and formed in a peripheral direction of the cylindrical portion,
    wherein roundness of a proximal end of the cylindrical portion is 20 µm or less.

7. A tape cartridge comprising:
    the tape reel according to claim 6; and
    a case that rotatably supports the tape reel and accommodates the tape reel and a tape wound around the tape reel.

* * * * *